(12) United States Patent
Kawachi et al.

(10) Patent No.: US 6,287,497 B1
(45) Date of Patent: Sep. 11, 2001

(54) MOLDED POLYTETRAFLUOROETHYLENE ARTICLE AND METHOD OF PRODUCTION THEREOF

(75) Inventors: Shoji Kawachi, Settsu; Kunihiko Honji, deceased, late of Tsurugashima, by Masako Honji, Hidetaka Honji, Asako Honji, legal repreasentatives; Tatsuro Uchida, Settsu; Osamu Shirasaki, Settsu; Masahiko Yamada, Settsu, all of (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/381,225

(22) PCT Filed: Mar. 17, 1998

(86) PCT No.: PCT/JP98/01116

§ 371 Date: Sep. 17, 1999

§ 102(e) Date: Sep. 17, 1999

(87) PCT Pub. No.: WO98/41386

PCT Pub. Date: Sep. 24, 1998

(30) Foreign Application Priority Data

Mar. 19, 1997 (JP) .................................................. 9-066010

(51) Int. Cl.[7] ........................................................ B27J 5/00
(52) U.S. Cl. ..................... 264/127; 264/310; 264/331.14; 428/421; 428/422; 526/242; 526/250; 526/255
(58) Field of Search .................................... 264/127, 310, 264/331.14; 428/421, 422; 526/242, 250, 255

(56) References Cited

FOREIGN PATENT DOCUMENTS

| 4-185426A | 7/1992 | (JP) . |
| 6-15663A | 1/1994 | (JP) . |
| 615663 | 1/1994 | (JP) . |
| 4185426 | 7/1997 | (JP) . |

Primary Examiner—Helen L. Pezzuto
(74) Attorney, Agent, or Firm—Birch, Stewart, Kolasch & Birch, LLP

(57) ABSTRACT

A large molded article block free from distortion and residual stress can be obtained by means of a method of producing a polytetrafluoroethylene molded article by compression-molding a polytetrafluoroethylene powder to form a preform and baking the resulting preform with rotating. Furthermore, a film or sheet having less curling and wrinkle can be obtained by cutting the molded article block.

20 Claims, 3 Drawing Sheets

(a)

(b)

(c)

(d)

MOLDED POLYTETRAFLUOROETHYLENE ARTICLE AND METHOD OF PRODUCTION THEREOF

This application is the national phase under 35 U.S.C. §371 of PCT International Application No. PCT/JP98/01116 which has an International filing date of Mar. 17, 1998, which designated the United States of America.

FIELD OF INVENTION

The present invention relates to a molded article made of polytetrafluoroethylene (hereinafter also referred to as "PTFE") and a method of producing the same. According to the present invention, a large PTFE molded article block having less distortion and small residual stress can be produced.

More particularly, the present invention relates to a PTFE block-shaped molded article (popularly referred to as a large-sized block), which has less distortion and height (i.e. length) of 800 mm or more. The present invention also relates to a film and sheet, which are obtained by cutting from the block and have less distortion and residual stress.

RELATED ART

PTFE has a very high melt viscosity of about $10^{11}$ poises at 380° C. and, therefore, molding methods such as extrusion and injection used for general thermoplastic resins (having a melt viscosity of $10^3$ to $10^4$ poises on molding) can not be applied.

For this reason, as the molding method of PTFE, the following compression molding method is most popular and block-shaped molded articles can be molded by this method.

(a) A mold is filled uniformly with raw material powder, and the mold is compressed by using a press at a pressure of 100 to 1,000 kg/cm².

(b) The resulting comparatively brittle preform is put in a furnace and heated to a baking temperature of 360 to 380° C., and then maintained at the same temperature until the sintering has uniformly completed.

(c) The furnace temperature is lowered to room temperature as such to obtain a block-shaped molded article.

The block thus obtained is cut to obtain a film having a thickness of about 25 μm. The resulting PTFE film can be used in heat-resistant electric wires, heat-resistant insulating tapes for vehicle motor and generator and the like.

However, the following problems occur when producing particularly large block-shaped molded articles by using this method.

(1) The internal stress because of raw material powder's own weight remains in the block-shaped molded article after baking.

(2) When particularly using modified PTFE as the raw material powder, the block-shaped molded article is deformed during the baking.

Cutting of such block-shaped molded article causes large loss in expensive PTFE material and curl of the resulting film.

SUMMARY OF INVENTION

An object of the present invention is to produce a large molded article block free from distortion and residual stress.

The present invention provides a method of producing a polytetrafluoroethylene molded article, which comprises compression-molding polytetrafluoroethylene powder to form a preform and then baking the resulting preform with rotating.

The present invention also provides a polytetrafluoroethylene molded article wherein loss in weight until a stable film or sheet can be cut:

[(weight of whole molded article)−(weight at minimum outer diameter)]÷(weight of whole molded article)×100 is not more than 0.7% by weight and a height of the molded article is not less than 800 mm.

The present invention further provides a film or sheet having less distortion, which is obtained by cutting from the polytetrafluoroethylene molded article.

DETAILED DESCRIPTION OF THE INVENTION

Figure 1:
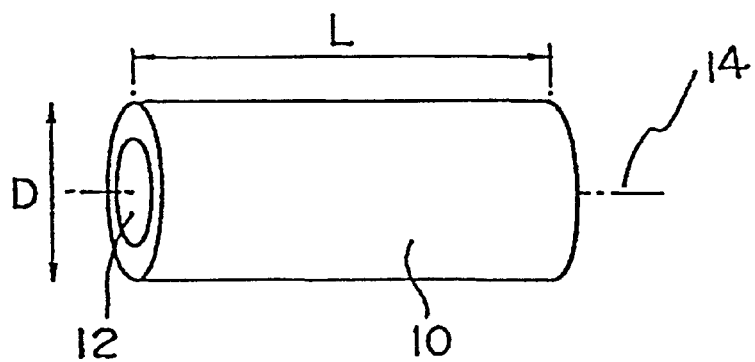
FIG. 1 is a perspective view illustrating the preform of the present invention.

The polytetrafluoroethylene powder is preferably powder obtained by a suspension polymerization, but may be powder obtained by other polymerization methods (e.g. an emulsion polymerization). The average particle diameter of the polytetrafluoroethylene powder may be from 10 to 1,000 μm.

The polytetrafluoroethylene powder is a homopolymer of tetrafluoroethylene, or a copolymer of tetrafluoroethylene and another fluoromonomer. In the copolymer, a molar ratio of tetrafluoroethylene to the fluoromonomer may be from 95:5 to 99.999:0.001. The copolymer may be a copolymer made of tetrafluoroethylene and perfluorovinylether (i.e. vinylether-modified polytetrafluoroethylene). Perfluorovinyl ether may be a compound represented by the formula:

wherein $R_f$ is an organic group, which essentially has a carbon atom and a fluorine atom, and has no hydrogen atom and optionally has an oxygen atom.

The $R_f$ group in the perfluorovinylether (I) may be a perfluoroalkyl group having 1 to 10 carbon atoms, a perfluoro(alkoxyalkyl) group having 4 to 9 carbon atoms, a group represented by the formula (II):

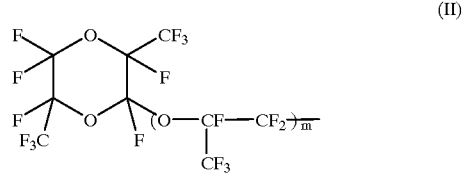

wherein m is a number of 0 to 4, or a group represented by the formula (III):

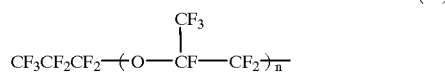

wherein n is a number of 1 to 4.

In the compression molding, the compression pressure may be generally from 100 to 1,000 kg/cm$^2$. The retention time for compression may be generally from 1 minute to 5 hours.

The shape of the resulting preform is not limited, but may be columnar or cylindrical. The columnar preform may have, along a symmetry axis of the column, a hole into which a rotary shaft is inserted. The preform may have a minimum length of 10 to 100 cm and a maximum length of 50 to 500 cm.

A block-shaped molded article can be obtained by baking the resulting preform with rotating.

In general, the column is preferably rotated continuously about a symmetry axis of the column under the state where the column is located so that the symmetry axis of the column is in a horizontal direction. Alternatively, the column is rotated in the direction vertical to the symmetry axis from the state where the column is located so that the symmetry axis of the column is in a vertical direction to provide the state where the column is turned upside down, and then the column may be further rotated to return to the original orientation. In case of rotating the column in the direction vertical to the symmetry axis, the rotation may carry out continuously or intermittently (for example, the column is allowed to stand at the position that the symmetry axis of the column is in a vertical direction for a fixed time (e.g. 1 to 60 minutes)). The rotation speed may be usually from 1 to 300 revolutions/h.

In the baking, the preform is heated to the temperature which is higher by 10 to 100° C., e.g. by 15 to 50° C. than the melting point of the preform. The heating time is usually from 1 to 500 hours. It is necessary to rotate the preform in the baking, and the rotation is preferably initiated before the temperature of the surface of the preform reaches the temperature which is lower by 100° C. than the melting point of the preform, because the preform begins to deform when it is heated even at a temperature less than the melting point. The rotation is preferably discontinued after the crystallization has been completed by cooling the preform.

A shaft is inserted through a hole of the preform. The shaft may be made of SUS (stainless steel) or Ni-plated metal (e.g. iron).

A polytetrafluoroethylene molded article can be obtained by baking. The size of the polytetrafluoroethylene molded article after baking is approximately the same as that of the preform.

The present invention provides a polytetrafluoroethylene molded article wherein a loss in weight until a stable film or sheet can be cut:

[(weight of whole molded article)−(weight at minimum outer diameter)]÷(weight of whole molded article)×100 is not more than 0.7% by weight.

Figure 7:
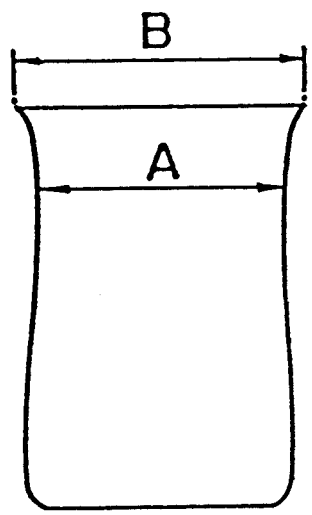
FIG. 7 is a schematic view illustrating methods of measuring deformation degree, roundness degree and bend (based on height of the molded article).
Figure 7:
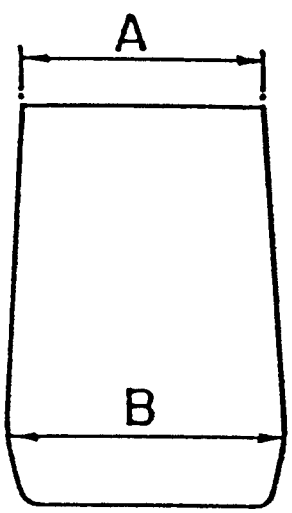
Figure 7:
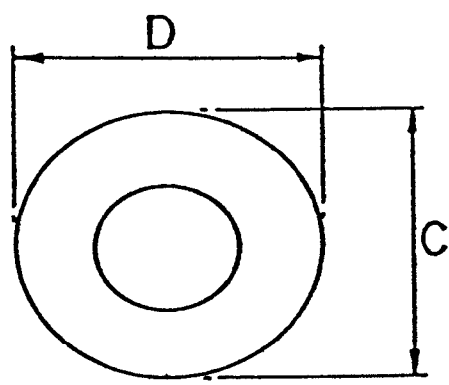
Figure 7:
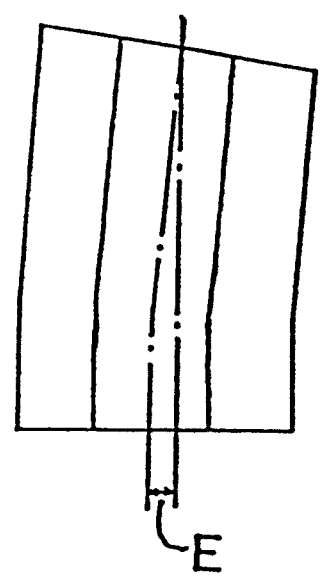

The molded article of the present invention has less deformation. The term "deformation" is used in a molded article whose diameter varies, a molded article whose roundness is not good or a molded article having a bend as shown in FIG. 7. The polytetrafluoroethylene molded article preferably has a roundness degree of not more than 0.3%, particularly not more than 0.2%; a deformation degree of not more than 1.0%, particularly not more than 0.8%; and a bend (based on the height of the molded article) of not more than 0.1%, particularly not more than 0.07%.

Roundness degree=(maximum outer diameter (D)−minimum outer diameter (C))÷(minimum outer diameter)×100, Deformation degree=(maximum outer diameter (B)−minimum outer diameter (A))÷(minimum outer diameter)×100, Bend=(difference between a center position of the bottom face of the molded article and a center position of the top face of the molded article (E))÷(height of the molded article)×100.

A scatter of specific gravity in the height direction with respect to one position in thickness of the molded article is not more than 0.005 and a scatter in specific gravity of the whole molded article is not more than 0.01.

A film of polytetrafluoroethylene (thickness: e.g. 5 to 10,000 μm) can be obtained by skiving the resulting baked molded article. The resulting film is uniform and has less distortion (particularly curl) and residual stress.

Distortion of a cut film or sheet means a distortion where a distortion produced during the molding and baking is released by cutting a block into a shape of film or sheet, resulting in curled or frilled film or sheet. Residual stress in a cut film or sheet means a stress, which causes a ununiform dimensional change because the cut film or sheet can not uniformly expand and shrink because of its residual stress produced on fabrication such as welding and melt welding.

The present invention provides a film or sheet having less distortion (in particular curling), which is cut from a polytetrafluoroethylene molded article. A length of film or sheet, which is obtained by cutting the cut film or sheet at 600 mm in the longitudinal direction (the direction of D in FIG. 1) (the longitudinal direction of sheet) and at a width of 50 mm in the height direction (the direction of L in FIG. 1) (the width direction of sheet), is preferably within ±5 mm based on a length of 600 mm at any position of the molded article (that is, comparison among all cut films or sheets).

Even if a film or sheet cut from the molded article obtained by baking is subjected to a heat treatment, the resulting distortion is small (that is, it uniformly expand and shrink). With regard to distortion of a film or sheet obtained by cutting the cut film or sheet into a square having a length of 200 mm in both the longitudinal direction and the height direction, treating at 360° C. for 2 hours, and then cooling at 25° C. per hour, the difference between the maximum length and the minimum length is preferably at most 5 mm in both the longitudinal direction (the direction vertical to extension direction of a hole of a molded article) and the height direction (the extension direction of the hole of the molded article) at any position of the molded article (that is, comparison among all cut films or sheets).

The resulting polytetrafluoroethylene film or sheet can be used in heat-resistant electric wires, heat-resistant insulating tapes for vehicle motor and generator, anticorrosion linings for chemical plant, piping gasket, and the like.

The present invention will be described in detail with reference to the accompanying drawings.

FIG. 1 is a perspective view illustrating a preform of the present invention. The preform 10 has cylindrical or columnar shape and has a hole 12. The hole 12 consists with a symmetry axis of the column. The preform 10 is located so that its symmetry axis is in a horizontal direction. The preform 10 has a diameter (average diameter) D and a length (average length) L as shown in the drawing. Usually, the diameter D is from 20 to 150 cm, for example from 30 to 70 cm, and the length L is from 30 to 300 cm, for example from 60 to 150 cm. The hole diameter is smaller by, for example, from 5 to 100 cm than D. The preform 10 has approximately the same shape and size as those of a molded article after baking. The preform 10 has a symmetry axis (namely, center axis or rotation symmetry axis) 14, which is along the center of the hole 12. The preform 10 is rotated about the symmetry axis 14.

Figure 2:
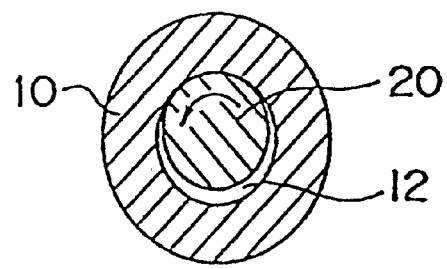
FIG. 2 is a sectional view illustrating a first embodiment wherein the preform is rotated.

FIG. 2 is a sectional view illustrating a first embodiment wherein the preform is rotated. The shaft 20, which is inserted through the hole 12 of the preform 10, is rotated in the direction of arrow. The rotation of the shaft 20 is transmitted to the preform 10, thereby to rotate the preform 10. The diameter $D_1$ of the hole 12 after baking and the diameter $D_2$ of the shaft 20 may satisfy $D_1/D_2=1$ to 1.5. The diameter of the shaft 20 is preferably nearly equal to the diameter of the hole 12. The shaft is provided with a heater for heating and a bore, through which a cooling medium flows, to heat or cool the shaft in order to make the temperature of the hole of the preform the same as the temperature of its outer surface. It is effective to provide the shaft with the heating and/or cooling means when the hole diameter of the preform is small.

Figure 3:
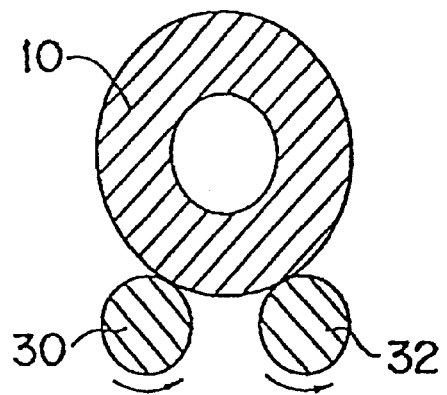
FIG. 3 is a sectional view illustrating a second embodiment wherein the preform is rotated.

FIG. 3 is a sectional view illustrating a second embodiment wherein the preform is rotated. Two rolls 30 and 32 are rotated in the direction of the arrow. The rotation of the rolls 30 and 32 is transmitted to the preform 10, thereby to rotate the preform 10. The effect that the outer periphery surface of the molded article is completed with good precision can be obtained by using the rolls 30 and 32.

Figure 4:
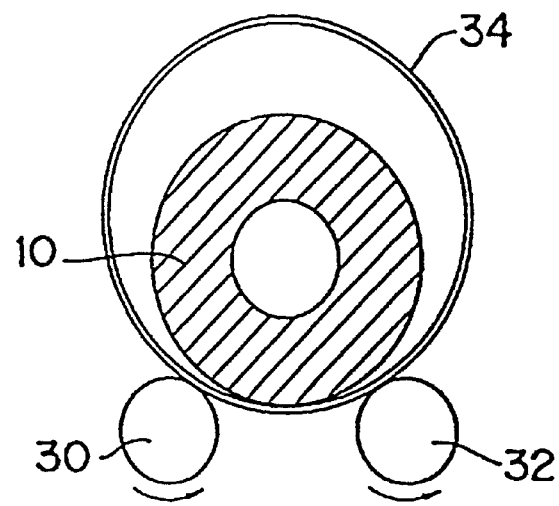
FIG. 4 is a sectional view illustrating a third embodiment wherein the preform is rotated.

FIG. 4 is a sectional view illustrating a third embodiment wherein the preform is rotated. A metal pipe 34 (e.g. an SUS pipe) exists in the outer side of the preform 10. Two rolls 30 and 32 are rotated in the direction of the arrow. The rotation of the rolls 30 and 32 is transmitted to the pipe 34, thereby to rotate the preform 10. According to this embodiment, the effect that the preform 10 contacts with the metal pipe 34 in a wider area can be obtained.

Figure 5:
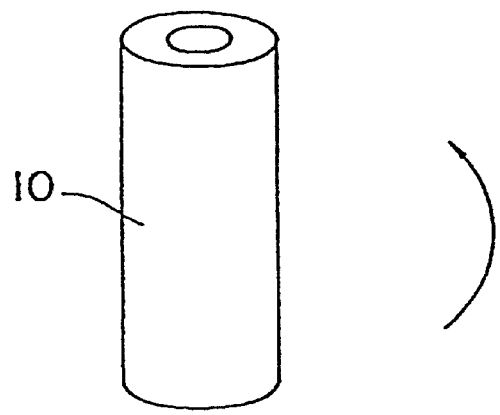
FIG. 5 is a perspective view illustrating a fourth embodiment wherein the preform is rotated.

FIG. 5 is a perspective view illustrating a fourth embodiment wherein the preform is rotated. The preform 10 is rotated in the direction vertical to the symmetry axis of the column (the direction of the arrow in the figure). The rotation is performed as follows. The column is rotated from the state that the column is located so that the symmetry axis of the column is in a vertical direction into the state that the column is inverted, and then the column is returned to the initial state. The rotation may be continuously conducted, but is preferably conducted intermittently.

Figure 6:
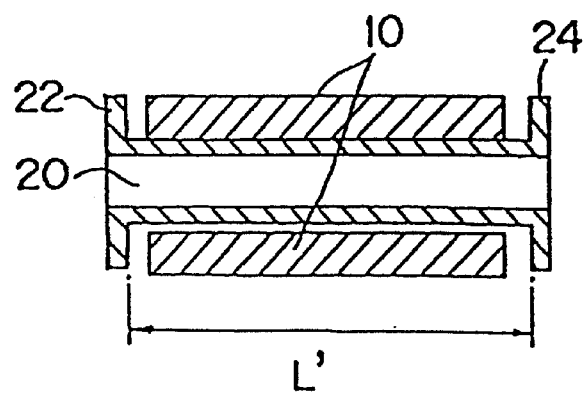
FIG. 6 is a sectional view illustrating the shape of a shaft.

FIG. 6 is a sectional view illustrating the shape of the shaft. The shaft 20 is inserted through the hole of the preform 10. The shaft 20 has collars 22 and 24. The collars 22 and 24 prevent the shaft 20 from removing from the preform 10. The distance L' from the collar 22 to the collar 24 is preferably about 1.2 times as much as the length of the preform 10. Whereby, the length of the preform does not become longer than the distance between collars even if the preform 10 expands. The collar 24 is removable.

FIG. 7 is a diagram illustrating methods of measuring a deformation degree, a roundness degree and a bend (based on the height of the molded article) of the molded article.

FIGS. 7(a) and (b) are elevational views of the polytetrafluoroethylene molded article illustrating a method of measuring the deformation degree. The deformation degree can be determined from the following formula:

Deformation degree=(maximum outer diameter (B)−minimum outer diameter (A))÷(minimum outer diameter (A))×100.

The deformation degree is preferably not more than 1.0%.

FIG. 7(c) is a top view of the polytetrafluoroethylene molded article illustrating a method of measuring the roundness degree. The roundness degree can be determined from the following formula: (wherein the roundness degree was measured at a position having the largest difference between the maximum outer diameter (D) and the minimum outer diameter (C) on the concentric circles of the molded article.)

Roundness degree=(maximum outer diameter (D)−minimum outer diameter (C))÷(minimum outer diameter)×100

The roundness degree is preferably not more than 0.2%.

FIG. 7(d) is a longitudinal sectional view of the polytetrafluoroethylene molded article illustrating a method of measuring the bend based on the height of the molded article. The bend can be determined from the following formula:

Bend=(difference between a center position of the bottom of the molded article and a center position of the top face of the molded article (E))÷(height of the molded article)×100.

The bend (based on the height of the molded article) is preferably not more than 0.1%.

Preferred Embodiments of the Invention

The following Examples illustrate the present invention.

EXAMPLE 1

A tetrafluoroethylene/perfluoropropyl vinyl ether copolymer (the weight ratio of tetrafluoroethylene to perfluoropropyl vinyl ether: 1000/1) (a melting point of the copolymer: 340° C.) powder (average particle diameter: about 30 μm) obtained by a suspension polymerization was compression-molded under the pressure of 200 kg/cm² at 25° C. for 120 minutes to give a preform shown in FIG. 1. The length (L) was 150 cm and the diameter (D) was 70 cm. The hole diameter was 25 cm. A shaft (diameter of 23 cm) was inserted though the preform. The preform and shaft were positioned in a heating oven and the temperature of the heating oven was elevated. When the temperature of the surface of the preform reached a melting point of the copolymer, the rotation of the shaft was initiated (rotation speed: 90 revolutions/h). The preform was baked by maintaining the preform at the temperature of 340 to 380° C. for 50 hours with rotating the preform at 90 revolutions/h. A block-shaped molded article was obtained by baking. The block-shaped molded article had a length of 159 cm, a diameter of 67 cm and a hole diameter of 24 cm.

A film having a thickness of 25 μm was obtained by skive-processing the block-shaped molded article. This film was free from a distortion and had no curling or wrinkle.

EXAMPLE 2 and

Comparative Example 1

In Example 2 and Comparative Example 1, a tetrafluoroethylene/perfluoropropyl vinyl ether copolymer (the weight ratio of tetrafluoroethylene to perfluoropropyl vinyl ether: 1000/1) (a melting point of the copolymer: 340° C.) powder (average particle diameter: about 30 μm) obtained by a suspension polymerization was compression-molded under the pressure of 200 kg/cm² at 25° C. for 120 minutes to obtain a preform shown in FIG. 1. For the dimension of the preform, its outer diameter was 400 mm, internal hole diameter was 150 mm and length was 1,000 mm. The preform was located in a metal pipe (inner diameter of 500 mm).

In Example 2, the following rotation baking was conducted (see FIG. 4).

The preform and the metal pipe were located in a heating oven and the rotation (rotation speed: 60 revolutions/h) of the metal pipe was initiated as well as elevating the temperature of the heating oven. Baking was conducted by maintaining the preform at the temperature of 340 to 380° C. for 25 hours with rotating the preform at 75 revolutions/h. A block-shaped molded article was obtained by baking.

In Comparative Example 1, the baking was conducted using a conventional method (longitudinal baking). That is, the preform was located in an oven so that the longitudinal direction of the preform is in a gravitational direction and heated at 340 to 380° C. for 25 hours.

1) Outer Diameter Deformation Amount (Cutting Loss)

The loss in weight until a stable film or sheet can be cut was determined. The cutting loss was 0.6% for Example 2 (rotation baking) and 4.5% for Comparative Example 1 (longitudinal baking). The cutting loss in Example 2 was remarkably reduced, which was about 1/7 times as much as that in Comparative Example 1.

2) Distribution of Specific Gravity in the Block

Distribution of specific gravity of an outer portion, an intermediate portion and an inner portion in the block-shaped molded article (polytetrafluoroethylene molded article) were measured, and distribution of specific gravity in the measured position and in the whole block were determined. The results are shown in Table 1.

TABLE 1

| | Example 2 | | | Comparative Example 1 | | |
|---|---|---|---|---|---|---|
| Position | Inner portion | Intermediate portion | Outer portion | Inner portion | Intermediate portion | Outer portion |
| Max | 2.1932 | 2.1952 | 2.1888 | 2.1948 | 2.1955 | 2.1891 |
| Min | 2.1907 | 2.1915 | 2.1853 | 2.1849 | 2.1857 | 2.1799 |
| Difference | 0.0025 | 0.0037 | 0.0035 | 0.0099 | 0.0098 | 0.0092 |
| Average value | 2.1919 | 2.1940 | 2.1875 | 2.1913 | 2.1935 | 2.1864 |

| | Whole block | Whole block |
|---|---|---|
| Max | 2.1952 | 2.1955 |
| Min | 2.1853 | 2.1977 |
| Difference | 0.0099 | 0.0156 |
| Average value | 2.1911 | 2.1904 |

3) Distortion in a Cut Sheet Having a Thickness of 1 mm

A cut sheet having a thickness of 1 mm was cut at a length of 600 mm and distortion of each portion (outer portion and inner portion of the block-shaped molded article) was measured when the sheet was cut at a width of 50 cm from the bottom portion of the block (merely cutting of the sheet leads to a change of the sheet length because of residual stress, therefore the distortion amount was measured). The results are shown in Table 2.

TABLE 2

| | Example 2 | | Comparative Example 1 | |
|---|---|---|---|---|
| Position of sheet | Inner portion | Outer portion | Inner portion | Outer portion |
| Length | | | | |
| Average mm | 600.5 | 600.7 | 600.5 | 603.1 |
| Max mm | 604 | 602 | 608.5 | 605 |
| Min mm | 597 | 598 | 598.5 | 598 |
| Based on length of 600 mm | +4 mm to −3 mm | +2 mm to −2 mm | +8.5 mm to −1.5 mm | +5 mm to −2 mm |
| Based on length of 600 mm in whole block | +4 mm to −mm | | +8.5 mm to −2 mm | |

4) Distortion in a Cut Sheet Having a Thickness of 3 mm

A 200 mm square sheet was cut from a cut sheet having a thickness of 3 mm and distortion of each portion (outer portion, intermediate portion and inner portion of the block-shaped molded article) was measured when it was re-baked.

Re-baking condition: 50° C./h temperature rise, 360° C. for 2 hours maintaining and 25° C./h cooling.

Distortion in the longitudinal direction of a sheet is shown in Table 3 and distortion in the height direction of a sheet is shown in Table 4.

TABLE 3

| | Example 2 | | | Comparative Example 1 | | |
|---|---|---|---|---|---|---|
| Position | Inner portion | Intermediate portion | Outer portion | Inner portion | Intermediate portion | Outer portion |
| Length | | | | | | |
| Average mm | 213.3 | 211.8 | 210.7 | 209.8 | 209.0 | 206.7 |
| Max mm | 213.5 | 213.0 | 212.0 | 211.5 | 211.0 | 210.0 |
| Min mm | 212.0 | 210.0 | 210.0 | 203.5 | 206.0 | 204.0 |
| Difference mm | 1.5 | 3.0 | 2.0 | 8.0 | 5.0 | 6.0 |

| | Whole block | Whole block |
|---|---|---|
| Max mm | 213.5 | 211.5 |
| Min mm | 210.0 | 203.5 |
| Difference mm | 3.5 | 8.0 |

TABLE 4

| | Example 2 | | | Comparative Example 1 | | |
|---|---|---|---|---|---|---|
| Position | Inner portion | Intermediate portion | Outer portion | Inner portion | Intermediate portion | Outer portion |
| Length | | | | | | |
| Average mm | 198.7 | 197.9 | 197.1 | 201.8 | 200.9 | 199.5 |
| Max mm | 200.0 | 200.0 | 198.0 | 207.0 | 207.0 | 203.0 |
| Min mm | 198.0 | 196.5 | 196.0 | 199.0 | 196.0 | 194.0 |
| Difference mm | 2.0 | 3.5 | 2.0 | 8.0 | 11.0 | 7.0 |

| | Whole block | Whole block |
|---|---|---|
| Max mm | 200.0 | 207.0 |
| Min mm | 196.0 | 194.0 |
| Difference mm | 4.0 | 13.0 |

The roundness degree, the deformation degree, bend and the loss in weight for the blocks in Example 2 and Comparative Example 1 were measured. The results are shown in Table 5.

TABLE 5

| | Example 2 | Comparative Example 1 |
|---|---|---|
| Roundness degree % | 0.2 | 0.4 |
| Maximum outer diameter mm | 393.25 | 402.1 |
| Minimum outer diameter mm | 392.5 | 400.8 |
| Deformation degree % | 0.7 | 6.8 |
| Maximum outer diameter mm | 394.9 | 421.2 |
| Minimum outer diameter mm | 392.1 | 394.3 |
| Bend % | 0.05 | 2.0 |
| Loss in weight % | 0.6 | 4.5 |

Deformation (the state like an elephant foot) occurs when a modified PTFE is melted, and bend also occurs during cooling because of difference of cooling speeds of block. Deformation occurs not only in the outer diameter, but also in the inner diameter depending on the size of the block.

In the case of the longitudinal baking of the polytetrafluoroethylene molded article, the deformation (the state like an elephant foot) occurs, and if the block height increases, the deformation and bend occur. A baking method which has dissolved all of them is a rotation baking. The rotation baking provides good results in all aspects.

Advantages of the rotation baking are as follows:

the resulting molded article has a good roundness degree, no bend, a lower outer diameter cutting loss, and a good dimensional stability of inner diameter;

distribution of specific gravity in the block is very uniform, the difference between maximum and minimum specific gravities is small, which is from 1/3 to 1/4 times as much as that of a molded article obtained by longitudinal baking at the same position and is 2/3 times in view of the whole block.

The distortion of a cut sheet in the longitudinal baking is a problem, particularly in the inner portion. The rotation baking has no difference at any position so that the distortion is very small.

Even when it is re-baked, the change of distortion is small at any position. This is very advantageous in glass backing and welding process.

Effects of the Invention

According to the present invention, a molded article dose not deform because a molded article during baking has a uniform load of its own weight. A material loss for fixing a shape of the molded article block is drastically reduced in comparison with that of a conventional method. Furthermore, in general, the distortion in a block is released by skive-processing the block, therefore the length varies at each portion and wrinkle occurs in the resulting film, but the stress distribution is uniform in the molded article block obtained by the method of the present invention, therefore curling or wrinkle after skive-processing the molded article is drastically reduced.

What is claimed is:

1. A method of producing a polytetrafluoroethylene molded article, which comprises compression-molding a polytetrafluoroethylene powder to form a preform and then simultaneously baking and rotating the resulting preform.

2. The method according to claim 1, wherein the polytetrafluoroethylene powder is made of vinyl ether-modified polytetrafluoroethylene.

3. The method according to claim 1, wherein the preform is rotated about a symmetry axis of the preform so that the symmetry axis of the preform is in a horizontal direction.

4. The method according to claim 1, wherein the preform is rotated on two rotary rolls.

5. The method according to claim 1, wherein a pipe for rotation is placed on two rotary rolls and the preform is rotated in the pipe.

6. The method according to claim 1, wherein the preform is intermittently rotated in a direction vertical to the symmetry axis of the preform.

7. The method according to claim 1, wherein the rotation is initiated before the surface of the preform reaches a temperature which is 100° C. less than the preforms's melting point.

8. The method according to claim 1, wherein the rotation is discontinued after the crystallization of the molded article, upon cooling, is completed.

9. The method according to claim 1, wherein the rotation speed of the preform is from 1 to 300 revolutions/h.

10. The method according to claim 3, wherein the preform has a hole, through which a rotary shaft is inserted, wherein the shaft is made of SUS or Ni-plated metal, and the shaft has a heating and/or cooling means to eliminate a difference in temperature in a diameter direction of the preform, and to heat or cool in a short time.

11. A method of producing a polytetrafluoroethylene film, which comprises cutting the molded article obtained by claim 1.

12. A polytetrafluoroethylene film obtained by the method of claim 11.

13. A polytetrafluoroethylene molded article wherein a loss in weight until a stable film or sheet can be cut:

$$[(\text{weight of whole molded article}) - (\text{weight at minimum outer diameter})] \div (\text{weight of whole molded article}) \times 100$$

is not more than 0.7% by weight and a height of the article is at least 800 mm.

14. The polytetrafluoroethylene molded article according to claim 13, which has a roundness degree of not more than 0.2%, a deformation degree of not more than 1.0% and a bend (based on height of the molded article) of not more than 0.1%:

$$\text{Roundness degree} = (\text{maximum outer diameter } (D) - \text{minimum outer diameter } (C)) \div (\text{minimum outer diameter}) \times 100,$$

$$\text{Deformation degree} = (\text{maximum outer diameter } (B) - \text{minimum outer diameter } (A)) \div (\text{minimum outer diameter}) \times 100,$$

$$\text{Bend} = (\text{difference between a center position of the bottom face of the molded article and a center position of the top face of the molded article } (E)) \div (\text{height of the molded article}) \times 100.$$

15. The polytetrafluoroethylene molded article according to claim 13, wherein a scatter of specific gravity in the height direction with respect to one position in the thickness of the molded article is not more than 0.005 and a scatter of specific gravity in the whole molded article is not more than 0.01.

16. A film or sheet having less distortion obtained by cutting from the polytetrafluoroethylene molded article of claim 13.

17. A film or sheet having less distortion, which is obtained by cutting from the polytetrafluoroethylene molded article of any one of claim 13 to give a film or sheet and subjecting the film or sheet to a heat treatment.

18. A method of producing a polytetrafluoroethylene molded article, which comprises compression-molding a polytetrafluoroethylene powder produced by suspension polymerization to form a preform and then simultaneously baking and rotating the resulting preform.

19. A method of producing a polytetrafluoroethylene molded article, which comprises compression-molding a polytetrafluoroethylene powder to form a preform and then simultaneously baking and rotating the resulting preform, wherein the preform has an external diameter of 20–150 cm and optionally a hole diameter which is smaller than the external diameter by 5–100 cm.

20. A method of producing a polytetrafluoroethylene molded article, which comprises compression-molding a polytetrafluoroethylene powder produced by suspension polymerization to form a preform and then simultaneously baking and rotating the resulting preform, wherein the preform has an external diameter of 20–150 cm and optionally a hole diameter which is smaller than the external diameter by 5–100 cm.

* * * * *